United States Patent [19]

Yerger

[11] Patent Number: 5,040,296

[45] Date of Patent: Aug. 20, 1991

[54] ERASABLE LABEL

[75] Inventor: Joseph W. Yerger, Tallulah, La.

[73] Assignee: Wesco Ventures, Inc., Dallas, Tex.

[21] Appl. No.: 798,388

[22] Filed: Nov. 15, 1985

[51] Int. Cl.⁵ .................. B42D 15/00; G09F 3/00
[52] U.S. Cl. .................................. 30/81; 40/299
[58] Field of Search .................. 283/81; 206/459, 387; 40/309, 10 R, 2 R, 299; 360/33.1, 118; 281/15 R

[56] References Cited

U.S. PATENT DOCUMENTS

| | | | |
|---|---|---|---|
| 1,542,456 | 6/1925 | Johns | 281/15 R |
| 3,638,340 | 2/1972 | Gottschalk | 283/81 |
| 3,642,191 | 2/1972 | Roof | 434/408 |
| 4,204,639 | 5/1980 | Barber et al. | |
| 4,312,688 | 1/1982 | Brodis et al. | |
| 4,501,396 | 2/1985 | Tomsyeck et al. | 283/81 |
| 4,507,883 | 4/1985 | Tarrant | 283/81 |
| 4,580,360 | 4/1986 | Gribb | 40/2 R |
| 4,585,254 | 4/1986 | Adams | 40/2 R |
| 4,589,685 | 5/1986 | Lazar | 434/410 |
| 4,609,231 | 9/1986 | Neuman | 206/387 |
| 4,618,061 | 10/1986 | Rubenfeld | 206/312 |
| 4,660,116 | 4/1987 | Westfall et al. | 360/118 |

FOREIGN PATENT DOCUMENTS 1030178  4/1978  Canada .................. 283/81

OTHER PUBLICATIONS

New Scientist, "A Helpful Label for Video Buffs", Nov. 29, 1984, p. 25 (Abstract).

Primary Examiner—Douglas D. Watts
Assistant Examiner—Paul M. Heyrana
Attorney, Agent, or Firm—Nixon & Vanderhye

[57] ABSTRACT

An erasable label is provided on a tape cassette, computer disc, reel, or the like. The label comprises polyester film (e.g. colored Mylar film) having first and second faces. Indicia, such as straight lines, a grid and words, are screen printed (or otherwise applied) onto the first face of the film, and adhesive is applied to the second face of the film. A release paper may cover the adhesive, and when it is removed the film may be adhesively secured to an outer surface of a tape cassette, computer disc, or the like. One may write on the label with a suitable felt pen, and when the cassette or disc is to be erased and reused merely wipe off the written indicia with a cloth. The screen printed indicia stays permanently affixed to the polyester film.

2 Claims, 2 Drawing Sheets

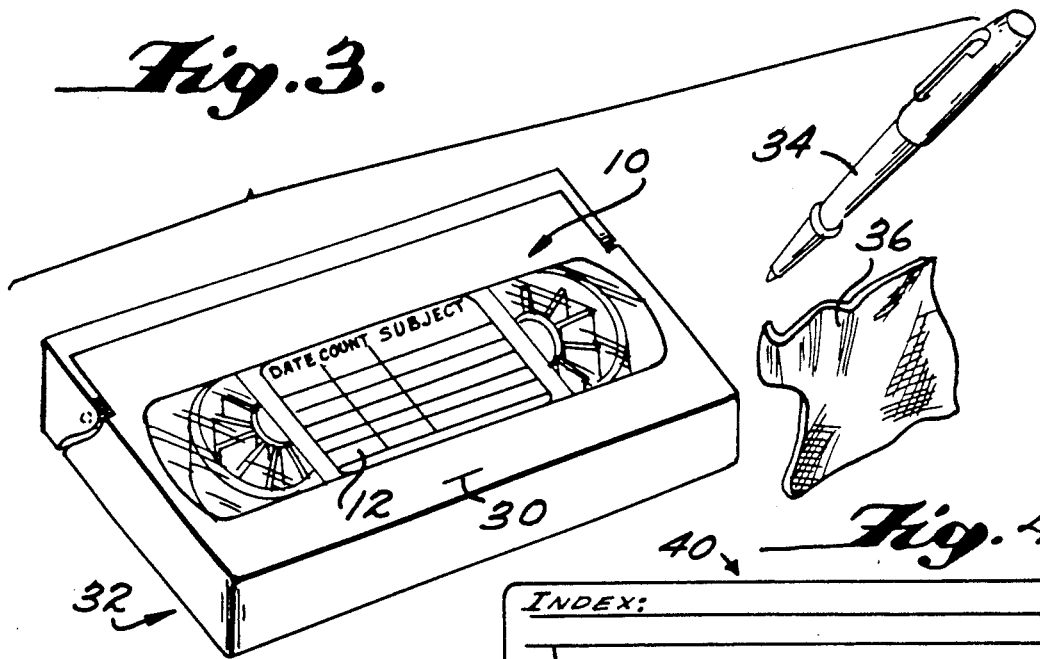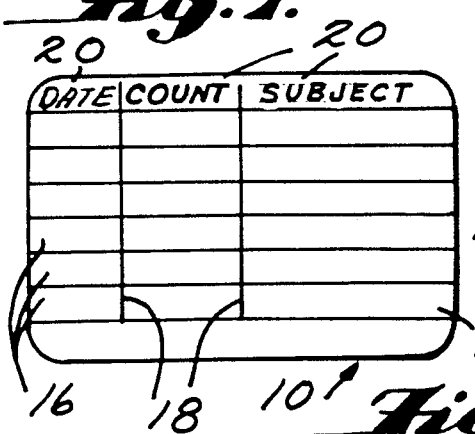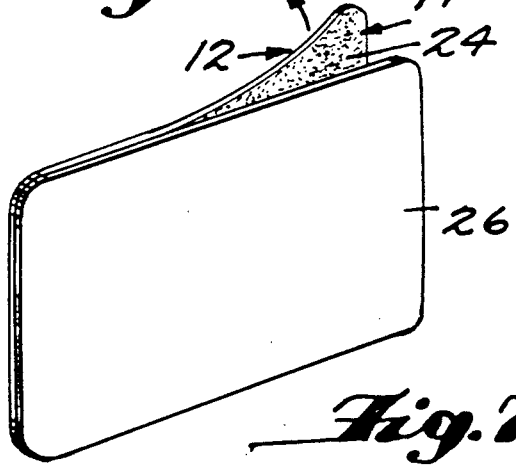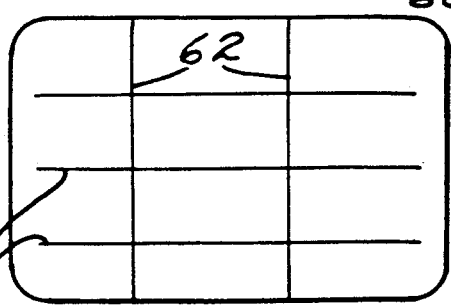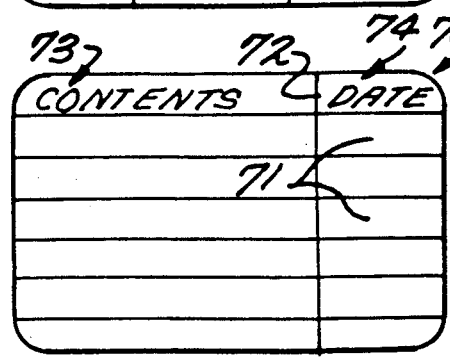

ERASABLE LABEL

BACKGROUND AND SUMMARY OF THE INVENTION

When video cassettes, audio cassettes, computer discs and like devices are utilized to record television programs, dictated material, data, and the like, it is highly desirable to be able to provide written indicia giving an indication of what the contents of the tape or disc are, as well as other useful information. However when the cassette or disc is to be reused, it is then necessary to remove the written indicia, and replace it by other indicia. To accommodate this, conventional cassettes and discs often have associated therewith paper labels which are adhesively secured to the cassette or disc, and which have indicia thereon on which material may be written. While the paper labels are effective for a short period of time, they quickly wear out due to the normal action of writing and erasing on them, and must be replaced by other stick-on paper labels. Additionally, after a while the written material on the tape cassette or disc label becomes illegible due to smearing, blotting, or destruction of the label material.

According to the present invention, an erasable label is provided that avoids the problems mentioned above. The erasable label according to the present invention is long lasting, and written indicia can be applied thereto easily and legibly, and completely wiped clear prior to reuse. The erasable label according to the present invention is particularly adapted for use on cassettes, such as video and audio cassettes, and discs, such as computer discs, but may also be readily adapted for use on reels, and other like devices.

According to one aspect of the present invention, an erasable label is provided which comprises a polyester film having first and second faces. Indicia is permanently applied to the first face, and adhesive is applied to the second face. The adhesive face is adapted to be moved into contact with a cassette or disc, or the like, so that the indicia on the first face faces outwardly. The indicia may comprise a plurality of spaced straight lines, a grid, and/or word indicia. Particularly useful for tape cassettes are the words "date", "count", and "subject" as indicia providing column headings. Preferably, the adhesive is originally covered with a release paper, which is removed prior to application of the label on the cassette. The labels may be colored. Coloring of the labels, and application of the permanent indicia thereto, preferably are practiced by screen printing, although other methods such as offset printing, sublimation, and the like, may be utilized.

According to another aspect of the present invention, a tape cassette is provided which has a plastic outer housing containing tape and reels therefor, and an erasable label on the outside of the plastic outer housing. The erasable layer comprises a polyester film with indicia permanently applied to the outwardly facing face thereof. The film label is preferably attached to the housing by an adhesive.

According to another aspect of the present invention, a method of indicating the contents of a tape cassette or computer disc is provided. A tape cassette or computer disc, with an erasable label as heretofore described, is provided. One using the cassette or disc merely applies written indicia to the erasable label with a felt pen. The indicia provides an indication of data relevant to what is contained on the tape or disc, such as the date of recordation, the "count" at which certain items appear, and the subject of those items. Once the usefulness of the particular data on the tape or disc no longer exists and the tape or disc is to be erased and reused, one merely takes a cloth and wipes off the indicia that has been applied by the felt pen, and the label is ready to accept additional written data.

It is the primary object of the present invention to provide a simple and effective erasable label, and method of utilization thereof, particularly adapted for cassettes, discs, and the like. This and other objects of the invention will become clear from an inspection of the detailed description of the invention, and from the appended claims.

BRIEF DESCRIPTION OF THE DRAWINGS

FIG. 1 is a top plan view of an actual size exemplary erasable label according to the invention;

FIG. 2 is a perspective view looking in on the back of the label of FIG. 1, with the release paper covering the adhesive back partially removed;

FIG. 3 is a perspective view of the label of FIG. 1 in place on a video cassette housing, and shown in association with a felt pen and cloth which are used for applying and removing written indicia from the label;

FIGS. 4 through 7 are top plan views of exemplary other formats of labels that may be utilized in the practice of the invention.

DETAILED DESCRIPTION OF THE DRAWINGS

Figure 8:
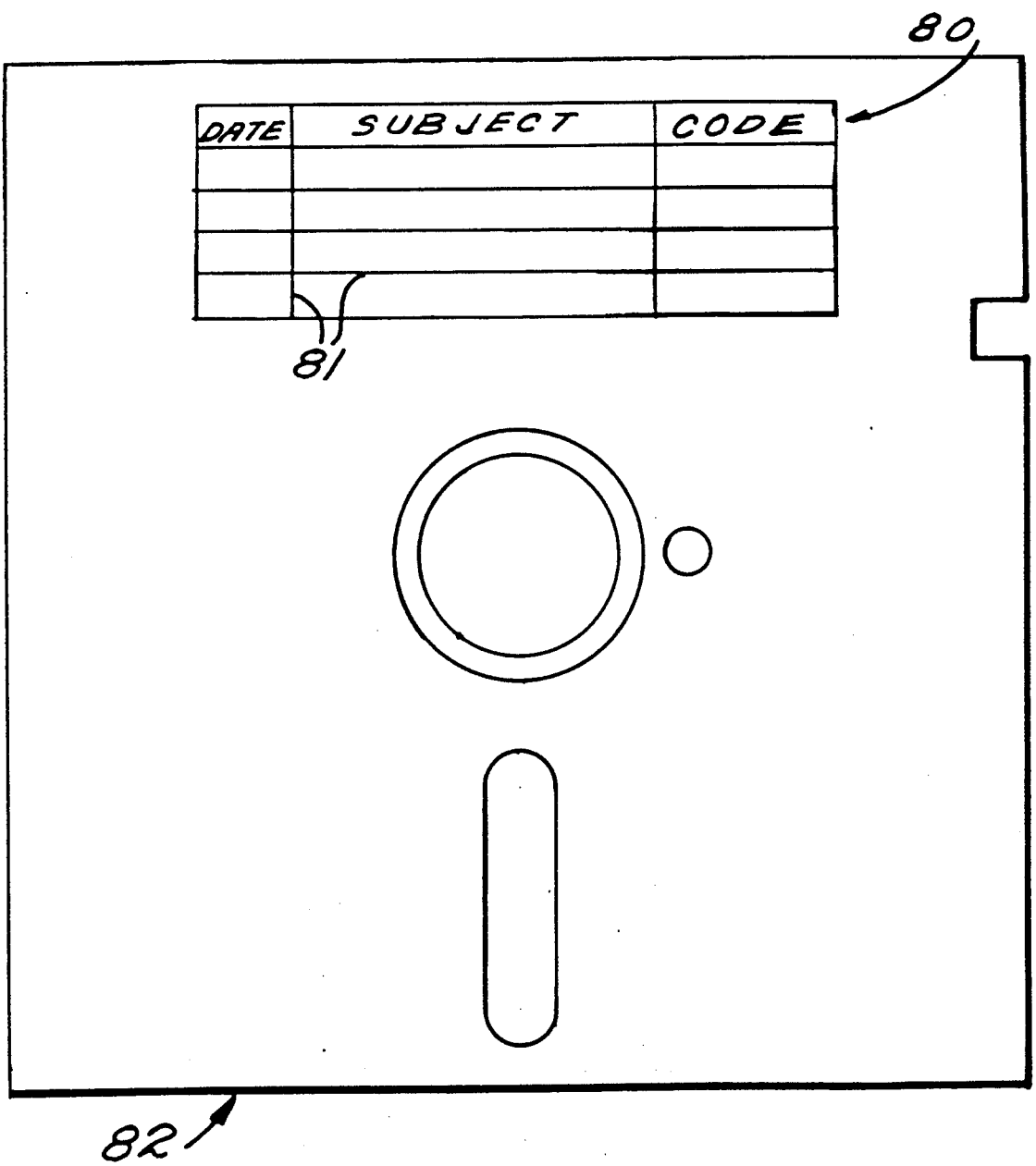
FIG. 8 is a top plan view of a computer disc with erasable label according to the invention.

An erasable label according to the present invention is shown generally by reference numeral 10 in the drawings. As seen particularly in FIG. 1, the label 10 preferably comprises a polyester film, such as a "MYLAR" film, of any suitable thickness (e.g. 1 mil). The polyester film has first and second faces 12, 14 (see FIGS. 1 and 2), respectively. On the first face 12, indicia are permanently applied. In the embodiment illustrated in FIG. 1, these permanently applied indicia comprise a first plurality of straight, parallel, spaced lines 16, a second plurality of parallel spaced lines 18 which are disposed perpendicular to the lines 16 and form a grid therewith, and word indicia 20. In this particular case the word indicia 20 are specifically adapted for use with a video cassette, and provide as column headings "date", "count", and "subject". Other suitable word indicia may be provided in order to facilitate accurate description of data contained within a cassette on which the label 10 is utilized.

The second face 14 of the label 10, as seen in FIG. 2, preferably is coated with an adhesive 24. The adhesive 24 is normally covered by a conventional release paper 26. When the release paper 26 is removed, then the adhesive face 24 may be applied to a cassette or the like, and the label 10 is then in place to be utilized.

The label 10 may be colored. For instance the label may have a chrome, white, or other color when visible during use. The color is preferably applied by screen printing techniques, but may also be applied by other conventional methods including spraying and roller-coating. A wide variety of commercially available inks which can permanently color, or provide indicia on, polyester are available, including those manufactured by Advance and Nazdar. The permanent indicia 16, 18, 20 preferably are also applied to the label by screen printing, although they too may be applied by other conventional techniques, such as sublimation or offset printing.

The adhesive 24 may be any conventional pressure sensitive adhesive that is compatible with polyester, such as those based on polyvinyl acetate, rubber, or acrylic.

In common usage of the label 10, preferably a crack and peel type label, the paper back 26 is removed, and the adhesive 24 of the second face 14 thereof is applied to the desired surface. In the embodiment illustrated in FIG. 3, the surface to which the label 10 is applied is the front face 30 of the plastic outer housing 32 (an outer surface) of a video tape cassette. As previously mentioned, however, the label 10 may also be utilized with audio cassettes, computer discs, reels, or any storing structure information in machine readable form, being applied to an outer surface thereof.

When the label 10 is applied as illustrated in FIG. 3, it is ready for use. One using the cassette 32 may provide written indicia on the label 10 utilizing a felt pen 34. The pen 34 can be of a type for application on polyester film, such as a conventional pen made for use with opaque projectors or transparencies. When the cassette 32 is ready for reuse, the written indicia may be removed merely by rubbing on the surface 12 of the label 10 utilizing cloth 36. All of the written indicia is thus removed, and the label 10 is ready for reuse. The label 10 can go through an indefinite number of cycles of applying written indicia, and wiping the written indicia off, with the permanent indicia 16, 18, 20, remaining. The label 10 also does not have a tendency to obliterate the written indicia during use as a result of wearing away of the label material.

FIGS. 4 through 7 illustrate other labels according to the present invention. The labels differ only in size, shape, and/or particular indicia provided thereon. For instance the label 40 of FIG. 4 includes as indicia the plurality of parallel lines 41 and the word "index", which have been screen printed onto the top face of the polyester film comprising the label 40. The label 50 of FIG. 5 includes as permanent indicia the parallel lines 51, and the words "side A" and "date", as indicated by reference numeral 52. The label 60 of FIG. 6 comprises as indicia a grid formed by the plurality of lines 61 intersecting a second plurality of lines 62. The label 70 of FIG. 7 includes as permanent indicia thereon the plurality of parallel lines 71, the single transverse line 72, and the written word indicia "contents" and "date" as indicated by reference numerals 73, 74.

FIG. 8 shows a label 80 according to the invention including as permanent indicia the grid 81, and the word headings "DATE", "SUBJECT", and "CODE". The label 80 is applied to an outer surface of a conventional computer disc 82, and can be used to indicate the contents thereof.

It will thus be seen that according to the present invention a simple yet effective erasable label, cassette or disc utilizing the label, and method of erasably providing data associated with a disc or cassette, have been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent products and procedures.

What is claimed is:

1. A method of keeping track of the contents of data on a tape cassette or computer disc, the cassette or disc having an outer surface, and a polyester film label affixed to the outer surface, the polyester film label consisting of a first outwardly facing uncovered face having indicia permanently applied thereto, said method comprising the steps of:

with a suitable felt pen, writing information on the label uncovered face related to information about the recording of data on the tape or disc;

periodically, when the tape or disc is to be reused, wiping off the indicia written on the label uncovered face, with a cloth, while not disturbing the permanent indicia on the label; and with a suitable felt pen, writing further indicia on the label corresponding to data recorded on the tape or disc when reused.

2. A method as recited in claim 1 wherein the label initially has adhesive, and a release paper, applied to a second face thereof, opposite the first face, and wherein the label is placed into operative association with the cassette or disc outer surface by removing the release paper from the adhesive, and then placing the adhesive on the second face of the label in contact with the cassette or disc outer surface.

* * * * *